United States Patent [19]

Panush et al.

[11] Patent Number: 5,147,453
[45] Date of Patent: Sep. 15, 1992

[54] PAINT COMPOSITIONS CONTAINING SILVER METAL FLAKE PIGMENT

[75] Inventors: Sol Panush, Farmington Hills; James M. Gelmini, Warren, both of Mich.

[73] Assignee: BASF Corporation, Parsippany, N.J.

[21] Appl. No.: 811,902

[22] Filed: Dec. 20, 1991

Related U.S. Application Data

[63] Continuation of Ser. No. 244,611, Apr. 9, 1988, abandoned, which is a continuation of Ser. No. 116,422, Nov. 3, 1987, abandoned.

[51] Int. Cl.5 .................. C09D 5/00; C08K 3/08; B05D 7/16; B32B 27/20
[52] U.S. Cl. .................. 106/1.19; 524/439; 524/780; 427/214; 427/216; 428/673
[58] Field of Search ............ 106/1.19; 524/439, 780; 427/214, 216; 428/673

[56] References Cited

U.S. PATENT DOCUMENTS

| | | | |
|---|---|---|---|
| 2,695,275 | 11/1954 | Gray | 106/1.19 |
| 2,924,535 | 2/1960 | Schaefer | 427/164 |
| 2,941,894 | 6/1960 | McAdow | 106/1.18 |
| 3,823,205 | 7/1974 | Zimmt | 525/228 |
| 4,025,665 | 5/1977 | Hannon | 427/192 |
| 4,103,049 | 7/1978 | Nishida et al. | 427/341 |
| 4,104,432 | 8/1978 | Manabe et al. | 428/216 |
| 4,253,875 | 3/1981 | Heymann et al. | 106/1.26 |
| 4,331,714 | 5/1982 | Tyran | 106/1.19 |
| 4,518,524 | 5/1985 | Stoetzer | 524/439 |
| 4,582,872 | 4/1986 | Hudgin et al. | 524/440 |
| 4,590,235 | 5/1986 | Troy | 524/439 |
| 4,595,606 | 6/1986 | St. John et al. | 524/440 |
| 4,695,404 | 9/1987 | Kwong | 106/1.19 |

*Primary Examiner*—Mark L. Bell
*Assistant Examiner*—Helene Klemanski
*Attorney, Agent, or Firm*—Paul L. Marshall

[57] ABSTRACT

Acrylic coating compositions containing silver metallic flake pigments are disclosed. The coatings are particularly adapted for use in automotive top coat systems as the base coat of a pigmented base coat/clear top coat coating system. The coating compositions have a hydroxyl content of less than about 8.0 wt. %. The resulting coating compositions when dried or cured to hard durable films do not exhibit discoloration associated with silver flake coatings.

12 Claims, No Drawings

PAINT COMPOSITIONS CONTAINING SILVER METAL FLAKE PIGMENT

This is a continuation of application Ser. No. 07/244,611 filed Sep. 9, 1988, now abandoned, which is a continuation of application Ser. No. 07/116,422 filed on Nov. 3, 1987, now abandoned.

DESCRIPTION

1. Technical Field

The field of art to which this invention pertains is coating compositions, coating methods and the resultant coated articles.

2. Background Art

Metal flake coating compositions are well known in the coating arts. In particular, metal flake coating compositions are widely used in automotive coatings to produce unique aesthetic effects. The metal flake which is conventionally used typically comprises an aluminum flake pigment. The flake is often used in the form of a pigment paste which is then processed and dispersed in a resin vehicle along with a conventional pigment to produce automotive paint coatings having various appearance effects such as silver metallic, gold metallic, blue metallic and various other colored metallics.

It is the present practice in the art to use multicoat coating systems for automotive finishes. Typically, these coating compositions comprise a thin pigmented inner basecoat overcoated with a thicker transparent outer topcoat. Examples of multicoat coating systems are disclosed in U.S. Pat. No. 3,369,147 which is incorporated by reference. The base coat/clear top coat coatings have superior appearance combined with superior durability.

There is a constant search in this art for new and better automotive coating compositions. The conventional, state-of-the-art, aluminum metal flake coating compositions while having good aesthetic appearance, are known to have deficiencies such as gray undertone, poor reflectivity, and the like, all of which are attributable to the presence of the aluminum metal flake pigment. These deficiencies associated with aluminum flake pigment may be overcome by the paint formulator to a certain extent, however, due to the inherent nature of these deficiencies, there is a limit as to the optimum aesthetic appearance that can be obtained from coatings containing aluminum flake. It would be advantageous to use metal flake other than aluminum flake to obtain coatings having improved coating characteristics and superior aesthetic appearance. There is a continuing need in this art for automotive coatings, particularly for use by Original Equipment Manufacturers (O.E.M.), having improved coating characteristics and superior aesthetic appearance.

It is known in this art that the inclusion of silver flake in coating compositions produces coatings having a superior aesthetic appearance. The superior appearance and reflectivity of silver flake, which does not produce the gray undertones present with aluminum flake, produces metal flake coatings having aesthetic appearances which are otherwise not producible.

Although several references disclose that silver can be used as a metal flake in coating systems, there is no mention in these references of the problems associated with the inclusion of silver flake in a coating system designed for exterior use and exposure to sunlight. Automotive coatings must have the highest possible resistence to sunlight, weathering and the like. U.S. Pat. No. 4,590,235 discloses a dual-layer coating containing metallic flake pigment in a high solids enamel coating. German Patent Application No. 1,147,344 discloses metallic paints and lacquers comprising a transparent film-forming vehicle containing thick plate-like metallic particles wherein the particles may comprise silver. U.S. Pat. No. 4,331,714 discloses flaked silver for use in conductive films.

U.S. Pat. No. 2,941,894 discloses metallized coating compositions comprising a film-forming material and metal mirror plate particles.

None of the references recognize that it is not presently possible to use silver flake in automotive coatings due to the fact that the silver flake tends to react rather rapidly with the resin binder system, thereby discoloring the coating. Therefore, what is needed in this art are automotive coating compositions, containing silver flake and having superior aesthetic appearance and durability, which do not discolor.

DISCLOSURE OF THE INVENTION

A film-forming coating composition is disclosed. The film-forming coating composition comprises a thermosetting acrylic resin, wherein the acrylic resin has minimal hydroxyl functionality, and, silver metal flake. The coating composition has a hydroxyl content of less than 8.0 wt. %. The coating, when cured to a hard film, exhibits no discoloration due to the presence of the silver flake.

Yet another aspect of the present invention is a substrate coated with at least one layer of a film-forming coating composition. The coating composition comprises a thermosetting acrylic resin, wherein the acrylic resin has minimal hydroxyl functionality, and, silver metal flake. The coating composition has a hydroxyl content of less than 8.0 wt. %. The coating, when cured to a hard durable film, exhibits no discoloration due to the presence of the silver flake.

Another aspect of the present invention is a method of coating a substrate with a coating of a thermosetting, film-forming coating composition. The improvement comprises using a film-forming coating composition comprising a thermosetting acrylic resin, wherein the acrylic resin has minimal hydroxyl functionality, and silver metal flake. The coating composition has a hydroxyl functionality of less than 8.0 wt. %. The coating, when cured to a hard durable film, exhibits no discoloration due to the presence of the silver flake.

Yet another aspect of the present invention is a film-forming coating composition, comprising a thermoplastic acrylic resin, wherein the acrylic resin has minimal hydroxyl functionality, and, silver metal flake. The coating composition has a hydroxyl content of less than 8.0 wt. %. The coating, when dried to a hard durable film, exhibits no discoloration due to the presence of the silver flake.

Yet another aspect of the present invention is a substrate coated with at least one layer of a film-forming coating composition, wherein the coating composition comprises a thermo-plastic acrylic resin. The acrylic resin has minimal hydroxyl functionality. The coating further comprises silver metal flake. The coating composition has a hydroxyl content of less than 8.0 wt. %. The coating, when dried to a hard, durable film, exhibits no discoloration due to the presence of silver flake.

Another aspect of the present invention is an improved method of coating a substrate with a thermoplastic film-forming coating composition. The improvement comprises using a film-forming coating composition comprising a thermoplastic acrylic resin, wherein the acrylic resin has minimal hydroxyl functionality, and, silver metal flake. The coating composition has a hydroxyl content of less than 8.0 wt. %. The coating, when dried to a hard, durable film, exhibits no discoloration due to the presence of silver metal flake.

The foregoing, and other features and advantages of the present invention, will become more apparent from the following description.

BEST MODE FOR CARRYING OUT THE INVENTION

While any substrate material can be coated with the coating compositions according to the present invention, including such things as glass, ceramics, asbestos, wood, fiber glass and even plastic material depending on the specific drying and/or curing requirements of the particular composition, the coating systems of the present invention are particularly adapted for metal substrates, and specifically as an automotive paint finish system. The substrate may also be bare substrate material or can be conventionally primed, for example to impart corrosion resistance. Exemplary metal substrates include such things as steel, aluminum, copper, magnesium, alloys thereof, and the like. The components of the composition can be varied to suit the temperature tolerance of the substrate material. For example, the components can be so constituted for air drying (i.e. ambient), low temperature cure (e.g. 150° F.–180° F.), or high temperature cure (e.g. over 180° F.)

The film forming compositions of the present invention and the components of these film-forming compositions must have minimal hydroxyl functionality. Minimal hydroxyl functionality is defined in terms of the weight percent of the total hydroxyl functionality in a coating composition. This would include hydroxyl functionality attributable to each component in the coating composition, including monomers in the resin, the cross-linking compositions such as melamine resin, pigments, solvents and conventional additives.

Minimal hydroxyl functionality is defined in terms of the levels of these quantified hydroxyls: minimal hydroxyl functionality will typically range from 0.0% to less than 8.0% by weight, preferably 0.0 wt. % to 5.0 wt. %.

The hydroxyl functionality of pigments cannot be calculated. The level of hydroxyls from pigments will be minimal and insignificant as long as the 8.0% by weight level is not exceeded by the quantifiable hydroxyls.

As previously mentioned, the hydroxyl content of the coating composition as a whole is critical to prevent discoloration. Hydroxyl content may be derived from many sources other than the resins, including solvents, amino resins, additives, and the like. All components in the coating compositions of the present invention must have minimal hydroxyl functionality in order to impart minimal hydroxyl functionality to the coating compositions so that the total hydroxyl content of the coating composition is less than 8.0 wt. %. Pigment dispersions, rheology control agents and all other miscellaneous additives conventionally added to coatings in this art must be carefully selected to satisfy this requirement.

The base coat preferably contains organic solvents as carriers. The base coats of the present invention will preferably contain microparticle rheology control agents such as those disclosed in U.S. Pat. Nos. 3,365,414, 4,290,932, 4,377,661, 4,414,357, and 4,447,536 which are incorporated by reference. Preferably about 2.0 weight percent to about 20 weight percent of the microparticles based upon the weight of the film forming solids is included in a coating formulation.

The coating compositions of the present invention may be thermosetting or thermoplastic. The acrylic resins in the coating compositions of the present invention are correspondingly thermosetting or thermoplastic. It is critical that the acrylic resins have the aforementioned minimal hydroxyl functionality. The thermoplastic acrylic resins useful in the coatings of the present invention include homopolymers of methyl methacrylate and butyl methacrylate and the like. The thermosetting acrylic resins useful in the coatings of the present invention include copolymers of methyl methacrylate, styrene, butyl acrylate, hydroxy ethyl acrylate, iso-butyl methacrylate, butyl methacrylate, methacrylic acid, propylene oxide and the like. Particularly preferred thermoplastic resins having minimal hydroxyl functionality include thermoplastic acrylic resins such as 84.0/16.0 methylmethacrylate - butyl methacrylate, and the like, and thermoplastic acrylic resins such as 84.6/14.2 methyl methacrylate - 2-ethyl hexyl acrylate copolymer, and the like. These resins must be made or purchased from commercial resin supply manufacturers.

Particularly preferred thermosetting acrylic resins having minimal hydroxyl functionality include acrylic resin copolymers, such as 1.7/14.8/46.8/36.7 acrylic acid - hydroxy propyl methacrylate - butyl methacrylate - methyl methacrylate copolymer, a rigid thermosetting acrylic resin manufactured by BASF Corporation, Inmont Division, Clifton, N.J., acrylic resin, such as 20.0/16.0/45.0/3.0/16.0 styrene - 2-ethyl hexyl methacrylate - Tone TM 111.100 monomer (Union Carbide, N.Y., N.Y.) - acrylic acid - butyl methacrylate copolymer, a flexible thermosetting acrylic resin and the like. The resin compositions may be manufacturered or purchased commercially.

The cross-linking agents which are used with the thermosetting acrylic resins of the present invention must be 100% methylated amino resins. It is particularly preferred to use Resimene X-755 TM methylated amino resin manufactured by Monsanto Co., St. Louis, Mo. However, most 100% methylated amino resin conventionally used in the coating art will work.

The silver flake pigment used in the coatings of the present invention will preferably have a purity of about 99.9% and a particle size distribution of about 1 micron to about 80 microns. A preferred silver flake is SF-135 brand silver flake manufactured by Handy & Harmon Chemical Products Center. This silver flake pigment is commercially available from the Handy & Harmon Chemical Products Center located at 1770 Kings Highway, Fairfield, Conn. 06430. Silver flake pigment is defined to mean flakes or particles of silver of various purities, or, flake or particles of alloys of silver wherein the alloys have sufficient silver to produce predominantly silver-like appearance. Silver flake is also defined to mean any particle having any configuration, said particle being solid, hollow, porous, having holes, or combinations thereof, and the like, wherein the particle has a coating of silver of various purities or a surface coating of alloys of silver, wherein the alloys contain sufficient silver to produce a predominantly silver appearance.

The solvents used in the coating composition of the present invention are organic solvents conventional in this art. The solvents include such organic solvents as butanol, methanol, alcohol and the like. Particularly preferred solvents include xylene, toluene, and ketones.

The conventional pigments used in the practice of the present invention include those conventional in this art such as phthalocyanines, perylenes, quinacridones and the like. Particularly preferred pigments include those with little or no hydroxyl functionality such as naphthols, toluidines, nickle metallized azo pigments and the like.

A typical composition for an enamel containing silver flake will have the identical variations in composition as current enamels containing aluminums or micas. Vehicle (resin) content, pigment content, solvent content and total enamel solids will vary dependent on color value (light or dark), color (red, blue, gray, silver, etc.) and enamel system in accordance with conventional practice in this art.

The coating compositions of the present invention will contain sufficient amounts of resin binder to provide good coating characteristics and good application characteristics. Typically the coating compositions will comprise about 35 wt. % to about 50 wt. % of acrylic resin, the preferred amount of acrylic resin will depend, as is conventional in this art, on the color of the coating. Good coating characteristics is defined to mean the totality of the features of the coating. The characteristics include the aesthetic appearance (color, gloss, hue, and the like), and durability (retention of color, gloss, hue, and the like), and three to five years of exposure to the elements -Florida exposure testing. Good application characteristics is defined as the ability to apply a coating in a production application facility with state of the art equipment ( for example: air atomized, rotational atomization with or without electrostatic assistance) in a mottle free, smooth, non-ghosted and uniform film so as to produce a coating having optimum coating characterisics. A typical composition for an enamel containing silver flake will have the identical variations in composition as conventional enamels in this coating art containing aluminums or micas. Vehicle content, pigment content, solvent content and total enamel solids will vary depending upon color value (light or dark), color (red, blue, gray, silver, etc.) and enamel system.

The following formulation comprising an acrylic base coat silver enamel is a base point for all formulas containing silver metal flake. In this formulation the constants are:

| 1) | Total solids | 73.21% by weight |
|---|---|---|
| 2) | Vehicle solids | 30.78 acrylic resin |
|   |   | 30.66 amino resin |
| 3) | Pigment solids | 11.68 |
| 4) | Spray (application solids |   |
|   | a) total | 58.48 |
|   | b) vehicle | 24.62 acrylic resin |
|   |   | 24.52 amino resin |
|   | c) pigment | 9.34 |

Solids and vehicle composition are subject to change with changes in the enamel system.

The coating compositions of the present composition will contain sufficient amounts of solvents to produce coatings having conventional solids contents. Typically the solids content will be about 40 wt. % to about 60 wt. %.

The amount of silver flake pigment used in the coating compositions of the present invention will be sufficient to produce the desired aesthetic appearance and will typically comprise about 2% to about 12%, the preferred amount of metallic flake depends, as is conventional in this art on the color of the coating.

Sufficient amounts of conventional pigments are incorporated into the coatings of the present invention to produce the desired color effects. Conventionally dark colors require higher pigment loadings while light colors require lower pigment loadings.

Hydroxyl content of the coatings, and the components of these coatings, of the present invention are preferrably calculated and can also be measured by testing methods conventional in this art.

Both the base coat and the topcoat can be applied by any conventional method in this art such as brushing, spraying, dipping, flow coating, etc. Typically spray application is used, especially for automotive finishing. Various types of spraying can be utilized such as compressed air spraying electrostatic spraying, hot spraying techniques, airles spraying techniques, etc. These can also be done by hand or by machine.

As stated above prior to application of the coating materials of the present invention a conventional corrosion resistant primer has already been applied. To this primed substrate is applied a base coat. When the coating is applied as the base coat of a pigmented base coat/-clear top coat coating system. The base coat is typically applied from about 0.4 mil to about 2.0 mil and preferably about 0.5 mil to about 0.8 mil. This thickness can be applied in a single coating pass or a plurality of passes with very brief drying ("flash") between applications of coats.

Once the base coat has been applied the transparent overcoat is applied after allowing the base coat to flash at ambient temperature for about 30 seconds to about 10 minutes, preferably about 1 to about 3 minutes. While the base coat can be dried for longer periods of time, even at higher temperatures, a much improved product is produced by application of the transparent topcoat after only a brief flash. Some drying out of the base coat is necessary to prevent total mixing of the base coat and topcoat. However, a minimal degree of base coat-topcoat interaction is desirable for improved bonding of the coatings. The topcoat is applied thicker than the base coat (preferably about 1.8 to 2.3 mils) and can also be applied in a single or multiple pass.

Pigment control is retained in the base coat while it is being overcoated. This is evidenced by lack of "strike-in" or migration of the two films (the base coat and topcoat) into each other. When "strike-in" occurs, and the coatings have outstanding clarity and depth. However, sufficient wetting takes place at the interface so that no problems of delamination and solvent release from either coating are obtained.

Once the topcoat is applied the system is again flashed for 30 seconds to 10 minutes and the total coatings are then baked at temperature sufficient to drive off all of the solvent in the case of thermoplastic layers and at temperatures sufficient to cure and cross-link in the case of thermosetting layers. These temperatures can range anywhere from ambient temperature to about 400° F. Typically in the case of thermosetting material temperatures of about 225° F. (e.g. 250° F.) are used, (e.g. for about 30 minutes).

Although it is preferred to use the coating of the present invention as base coats of pigmented base coat/- clear top coat coating systems, the coating composition may be used as top coats.

The following examples are illustrative of the principles and practice of this invention, although not limited thereto.

Parts and percentage where used are parts and percentages by weight.

EXAMPLE 1

A thermosetting coating composition was manufactured by blending the following components using a paddle type mixer for about 30 minutes until a uniformly dispersed coating composition was obtained:

| | |
|---|---|
| 42.58 parts | Acrylic Resin |
| 30.66 parts | Resimene X-755 TM crosslinking agent |
| 1.95 parts | Didodicyl Benzene Sulfonic Acid |
| 13.13 parts | Xylene |
| 11.68 parts | Silver Flake |
| 100.00 | |

This sample was then reduced to spray viscosity (25" #2 Fisher Cup).

The acrylic resin composition comprised

| | |
|---|---|
| 1.40 | Parts Styrene |
| 51.24 | ISO Butyl Methacrylate |
| 1.40 | 2-Ethyl Hexyl Methacrylate |
| 14.00 | Hydroxy Ethyl Acrylate |
| 1.96 | Acrylic Acid |
| 30.00 | Epsilon Coprolactone (2-Oxepanone manufactured by Union Carbinde Co., N.Y., N.Y.) |
| 100.00 | |
| Viscosity: | Y-Z |
| Solids (wt.): | 72.5 + 1.0 |
| Solids (Vol.): | 69.1 + 1.0 |
| Acid Number: | 16-19 |

Steel panels having a cured, conventional primer coating were coated with an inner base coat of this silver-flake containing coating composition to a thickness of about 1.0 mils using a siphon spray applicator. The coating was allowed to flash for about 15 minutes. An outer clear coat coating was then applied wet-on-wet over the base coat to a film thickness of about 2.0 mils. The clear coat coating composition comprised acrylic resin, Resimene X-755 TM crosslinking agent, solvent, acid, and an ultra-violet absorber. The coatings were cured in a oven at about 250° F. for about 30 minutes. The hydroxyl content of the coating composition was 7.96 wt. %. The hydroxyl content was ascertained in the following manner: The hydroxyl content was measured by calculating the composition of the acrylic resin (only compound with hydroxyl functionality) as follows: 42.58 pounds wet resin×0.725% NV of resin=30.87 pounds solid resin.

30.87 pounds solid resin×14.0% OH monomer in resin=4.32 pounds functional hydroxyl monono.

42.58 pounds wet resin−30.87 pounds solid resin=11.71 pounds of solvent.

11.71 pounds solvent×31.1% OH-containing solvent in solvent composition=3.64 # functional OH from solvent.

$$4.32 \text{ pounds OH} + 3.64 \text{ pounds OH} = \frac{7.96 \text{ pounds OH}}{100 \text{ pounds TOTAL}} \times$$

$$100 = 7.96\%$$

The coatings demonstrated good appearance and reflectivity and an absence of yellowing. Yellowing was tested by visually comparing the coatings to a non-yellowing standard and to a yellowing standard.

EXAMPLE 2

A thermoplastic coating composition was manufactured by blending the following components in a conventional mixing vessel using a conventional paddle type mixer for about 30 minutes until a uniformly dispersed coating composition was obtained:

| | |
|---|---|
| 63.37 parts | Acrylic Resin |
| 10.00 parts | Toluene |
| 5.61 parts | Acetone |
| 2.44 parts | Butylacetate |
| 8.29 parts | Methyl Ethyl Ketone |
| 8.29 parts | Silver Flake |
| 100.00 | |

The acrylic resin comprised 84.0% methlmethacrylate and 16.0% butylmethacrylate having the following parameters:

| | |
|---|---|
| Viscosity: | Y-Z |
| Solids (wt.): | 40 ± 1.0 |
| Solids (vol.): | 34 ± 1.0 |

Steel panels having a cured conventional primer coating were coated with an inner basecoat of this silver flake-containing coating composition to a thickness of about 1.0 mils using a siphon spray applicator. The coating was allowed to flash for about 15 minutes. An outer clear coat coating was then applied wet-on-wet over the base coat to a film thickness of about 2.0 mils. The clear coat coating composition comprised a thermoplastic acrylic resin, solvents, and an ultra-violet absorber. The coatings were dried in a oven at about 325° F. for about 30 minutes. The hydroxyl content of the coating composition was about 0.0 wt. %. The hydroxyl content was calculated in a manner similar to that previously mentioned. No hydroxyl functionability in system was present.

The coatings demonstrated good appearance and reflectivity and an absence of yellowing. Yellowing was tested by comparison to a non-yellowing and a yellowing standard.

EXAMPLE 3

A thermosetting coating composition comprising aluminium flake and having the following information was made in accordance with the procedure of Example 1.

| | |
|---|---|
| 42.58 | Thermosetting acrylic resin of Example 1 |
| 30.66 | Resimene x-755 |
| 1.95 | Didodecyl Benzene Sulfonic Acid |
| 13.13 | Xylene |
| 11.68 | Aluminum flake (SS3141 brand, manufactured by Silverlene, Lansford, Pennsylvania) |
| 100.00 | |

Steel panels were coated in accordance with the procedure of Example 1. When compared to the panels of Examples 1 and 2, the panels of Examples 1 and 2 appeared softer, less blue-gray, softer, more affluent and more sophisticated. The panel of Example 3 had a gray undertone.

EXAMPLE 4

A thermosetting coating composition was made in accordance with the procedure of Example 1. The composition had the following formulation:

| 56.03 | Acrylic Resin |
| --- | --- |
| 27.85 | RV0571 Butylated Melamine resin manufactured by Celanese Chemical Co., N.Y., N.Y. |
| 7.85 | Xylene |
| 8.27 | Silver Flake |
| 100.00 | |

The acrylic resin comprised:

| 2.7 | Acrylic Acid | |
| --- | --- | --- |
| 20.3 | 2-hydroxy ethyl acrylate | |
| 25.7 | Iso butyl methacrylate | |
| 25.7 | Methyl methacrylate | |
| 25.6 | 2-ethyl hexyl acrylate | |
| | Viscosity: | H-K |
| | Acid No.: | 20-25 |
| | Solids (wt.): | 60 ± 1 |
| | Solids (Vol.): | 52.5 ± 1 |

The coating composition had a 33.0 wt. % OH functionality calculated from the monomer composition and solvent content of the acrylic resin and the melamine resin. The coating when compared to the coated panels of Examples 1 and 2, had a very definite yellow coloring versus the pure silver-white color of Examples 1 and 2.

The coatings of the present invention containing silver metal flake surprisingly and unexpectedly do not yellow as a result of maintaining the hydroxyl functionality of the coating composition below about 8.0 wt. %. It is now possible to use silver metal flake as a component of coatings, particularly automotive coatings, and to thereby produce coatings having an optimum aesthetic appearance.

Although this invention has been shown and described with respect to detailed embodiments thereof, it will be understood by those skilled in the art that various changes in form and detail thereof may be made without departing from the spirit and scope of the claimed invention.

We claim:

1. A film-forming coating composition comprising
a thermosetting acrylic resin wherein the acrylic resin has minimal hydroxyl functionality, said coating composition having less than 8.0 wt. % hydroxyl functionality; and
silver metal flake,
the coating composition, when cured to a hard film, exhibiting no discoloration due to the presence of the silver flake.

2. The coating composition of claim 1, wherein said composition comprises the base coat of a base coat-clear top coat coating system.

3. A substrate coated with at least one layer of a film-forming coating composition, wherein the coating composition comprises
a thermosetting acrylic resin wherein the acrylic resin has minimal hydroxyl functionality, said coating composition having less than 8.0 wt. % hydroxyl functionality; and
silver metal flake,
the coating composition, when cured to a hard durable film, exhibiting no discoloration due to the presence of the silver flake.

4. The substrate of claim 3 wherein the coating composition comprises the base coat of a base coat-clear top coat coating system.

5. In a method of coating a substrate with a coating of a thermosetting film-forming coating composition by applying said coating composition to a substrate, the improvement comprising using a film-forming coating composition comprising
a thermosetting acrylic resin having minimal hydroxyl functionality, wherein the coating composition has less than 8.0 wt. % hydroxyl functionality; and
silver metal flake;
the coating composition, when cured to a hard durable film, exhibiting no discoloration due to the presence of the silver flake.

6. The method of claim 5, wherein the coating composition comprises the base coat of a base coat-clear top coat coating system.

7. A film-forming coating composition comprising
a thermoplastic acrylic resin having minimal hydroxyl functionality, wherein the acrylic resin and coating composition has less than 8.0 wt. % hydroxyl functionality; and
silver metal flake;
the coating composition, when cured to a hard durable film, exhibiting no discoloration due to the presence of the silver flake.

8. The coating composition of claim 7 wherein the coating composition comprises the base coat of a base coat-clear coat top coat coating system.

9. A substrate coated with at least one layer of a film-forming coating composition, wherein the coating composition comprises
a thermoplastic acrylic resin having minimal hydroxyl functionality, wherein the coating composition has less than 8.0 wt. % hydroxyl functionality; and
silver metal flake;
the coating composition, when cured to a hard durable film, exhibiting no discoloration due to the presence of the silver flake.

10. The substrate of claim 9 wherein the coating composition comprises the base coat of a base coat/clear top coat coating system.

11. In a method of coating a substrate with a coating of a thermoplastic film-forming coating composition by applying said coating composition to a substrate, the improvement comprising using a film-forming composition comprising
a thermoplastic acrylic resin having minimal hydroxyl functionality, wherein the coating composition has less than 8.0 wt. % hydroxyl functionality; and
silver metal flake;
the coating, when cured to a hard durable film, exhibiting no discoloration due to the presence of the silver flake.

12. The method of claim 11 wherein the coating composition comprises the base coat of a base coat-clear top coat coating system.

* * * * *